United States Patent Office

3,504,627

Patented Apr. 7, 1970

3,504,627

RESIN-BACKED ELECTROTYPE PRINTING PLATE AND PROCESS FOR THE PREPARATION THEREOF

John A. Elder, Jr., Plainfield, and John B. Wheeler III, Middlesex, N.J., assignors to Union Carbide Corporation, a corporation of New York No Drawing. Filed June 1, 1966, Ser. No. 554,328

Int. Cl. B41n *1/12;* B41m *1/14*

U.S. Cl. 101—395 5 Claims

ABSTRACT OF THE DISCLOSURE

Resin-backed, undistorted electrotype printing plates capable of being registered in form-color printing processes have been made by bonding a metal electrotype shell to a thermoplastic polyhydroxyether resin composition modified with a polyurethane elastomer and plasticizer.

This invention relates to an improved electrotype printing plate and its fabrication. More particularly, it relates to electrotype printing plates having a thermoplastic polymer backing.

Electrotype printing plates are prepared by a process which includes preparing an original type-form or original photo-engraved etched plate and molding these against a 30–40 mil thick sheet of rigid polyvinyl chloride to produce a negative mold of the original which is known in the art as a matrix. The surface of the matrix is rendered electrically conductive and is immersed in a nickel electroplating bath to deposit a layer of nickel on the matrix surface generally no thicker than about 0.5 mil. This is followed by immersion in a copper electroplating bath where a 12–15 mil thick copper layer is plated over the nickel layer. Finally a thin layer of tin is plated over the copper to provide an adhesive base for the lead backing which is next applied. The nickel-copper-tin composite shell is separated from the matrix and the edges are cut to form a pan which is filled with molten lead at 350° C. and allowed to cool. The resultant lead-backed electrotype is usually warped and has to be flattened by a tedious hammering process. The electrotype is curved, beveled along the edge, shaved from the back to the desired thickness, and non-image areas routed out.

The need has existed for many years in the printing industry for a light weight easily machinable, readily handled material to replace hot, cast lead in backing up electrotypes. Lead as a backing is very heavy and requires a great deal of hand correction work. Plastic materials have appeared attractive for this purpose because they are much lighter and can be molded to closer tolerances at lower temperatures. Plastic materials previously tried such as epoxy resins, polyesters, vinyl resins, polyamides such as nylon and the like, which have been tried in the past, have had drawbacks in that they are either brittle, lack adhesion, or are soft, or require complex handling preparations. Thermoplastic polyhydroxyethers have proved themselves superior to most other thermoplastics for backing up electrotype relief printing plates to run on high speed rotary presses. However, these polyhydroxyether resins present a misregister problem when used to back electrotypes employed in sets of four color process plates.

This misregister problem was analyzed in terms of the stresses imposed on the copper by the resin as the result of differential thermal contraction of the metal and resin components in the copper shell/phenoxy backing laminate. It was determined that in order to overcome the misregister problem a backing compound would have to be formulated having a lower melting point than that of thermoplastic polyhydroxyether itself, namely about 160° F., the modulus of elasticity would have to be reduced from 370,000 p.s.i. to about 140,000 p.s.i. at 75° F. and the short term stress relaxation at 0.25 percent to 0.5 percent strain would have to be increased from about 9 percent to about 60 percent. These changes are required because misregister results from the rigid resin becoming the dominant element in the copper shell resin backing laminate whenever any changes in dimensions occur such as thermal-contraction during cooling or when plates are cold formed to flatten them. Distortions arising with copper shells backed with unmodified thermoplastic polyhydroxyether resin vary from 0.020″ to almost 0.125″ over a 15″ wide plate. This uncontrolled variation from plate to plate causes the misregister.

It has been discovered that this miregister problem is obviated when a modified thermoplastic polyhydroxyether is used as a backing for the electrotype. A suitable modified thermoplastic polyhydroxyether composition comprises (1) about 60 to 90 parts by weight of a thermoplastic polyhydroxyether having the general formula:

$$\left[-D-O-E-O-\right]_n$$

wherein D is the radical residuum of a dihydric phenol, E is an hydroxyl containing residuum of an epoxide, and *n* represents the degree of polymerization and is at least 30, (2) about 5 to 30 parts by weight of an elastomer, and (3) about 5 to 30 parts by weight of a primary plasticizer selected from the group consisting of dialkyl phthalates, dialkyl esters of dibasic aliphatic acids containing from 6 to 10 carbon atoms, triaryl phosphates, alkylaryl phosphates, and trialkyl phosphates.

If desired, about 0.1 to 0.25 percent by weight of a metal stearate mold lubricant and/or coloring material can also be added to the composition. A preferred composition comprises (1) about 70 to 80 parts by weight of a thermoplastic polyhydroxyether, (2) about 10 to 15 parts by weight of an elastomer and (3) about 10 to 15 parts by weight of a primary plasticizer selected from the group indicated above.

The term "thermoplastic polyhydroxyether" herein refers to substantially linear polymers having the formula:

$$\left[-D-O-E-O-\right]_n$$

wherein D, E and *n* are as defined above. The term "thermoplastic polyhydroxyether" is intended to include mixtures of at least two thermoplastic polyhydroxyethers.

The thermoplastic polyhydroxyethers can be prepared by admixing from about 0.985 to about 1.015 moles of an epihalohydrin with one mole of a dihydric phenol together with from about 0.6 to 1.5 moles of an alkali metal hydroxide, such as, sodium hydroxide or potassium hydroxide generally in an aqueous medium at a temperature of about 10° to about 50° C. until at least about 60 mole percent of the epihalohydrin has been consumed. The thermoplastic polyhydroxyethers thus produced have reduced viscosities of at least 0.43, generally from 0.43 to about 1 and preferably from about 0.5 to 0.7. Reduced viscosity values were computed at 25° C.

The dihydric phenol contributing the phenol radical residuum D, can be either a dihydric mononuclear phenol such as those having the general formula:

$$HO-\underset{}{\overset{(Y)_r}{Ar}}-R^1-\overset{(Y_1)_z}{Ar}-OH$$

wherein Ar is an aromatic divalent hydrocarbon such as naphthalene and, preferably, phenylene, Y and $Y_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, $r$ and $z$ are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or a divalent radical including, for example, $$-\underset{\substack{\| \\ O}}{C}-$$

—O—, —S—, —SO—, —$SO_2$— and —S—S—, and divalent hydrocarbon radicals such as alkylene, alkylidene, cycloaliphatic, e.g., cycloalkylene and cycloalkylidene, halogenated alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include among others:

The bis(hydroxyphenyl)alkanes such as 2,2-bis(4-hydroxyphenyl)propane,
2,4'-dihydroxydiphenylmethane,
bis(2-hydroxyphenyl)methane,
bis(4-hydroxyphenyl)methane,
bis(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorophenyl)ethane,
1,1-bis(3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis(4-hydroxynaphthyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
bis-(4-hydroxyphenyl)cyclohexylmethane,
1,2-bis(4-hydroxyphenyl)-1,2-bis(phenyl)propane,
2,2-bis(4-hydroxyphenyl)-1-phenyl-propane and the like;

Di(hydroxyphenyl)sulfones such as bis(4-hydroxyphenyl)sulfone,
2,4'-dihydroxydiphenyl sulfone,
5'-chloro-2,4'-dihydroxydiphenyl sulfone,
5'-chloro-4,4'-dihydroxydiphenyl sulfone and the like;

Di(hydroxyphenyl)ethers such as bis(4-hydroxyphenyl) ether, the 4,3'-, 4,2'-, 2,2'-, 2,3'-dihydroxydiphenyl ethers, 4,4'-dihydroxy-2,6-dimethyldiphenyl ether,
bis(4-hydroxy-3-isobutylphenyl)ether,
bis(4-hydroxy-3-isopropylphenyl)ether,
bis(4-hydroxy-3-chlorophenyl)ether,
bis(4-hydroxy-3-fluorophenyl)ether,
bis(4-hydroxy-3-bromophenyl)ether,
bis(4-hydroxynaphthyl)ether,
bis(4-hydroxy-3-chloronaphthyl)ether,
bis(2-hydroxydiphenyl)ether,
4,4'-dihydroxy-2,6-dimethoxydiphenyl ether,
4,4'-dihydroxy-2,5-diethoxydiphenyl ether, and the like.

Also suitable are the bisphenol reaction products of 4-vinylcyclohexene and phenols e.g., 1,3-bis(p-hydroxyphenyl)-1-ethylcyclohexane, and the bisphenol reaction products of dipentene or its isomers and phenols such as 1,2 - bis(p - hydroxyphenyl) - 1 - methyl-4-isopropylcyclohexane as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula:

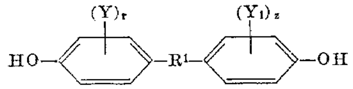

wherein Y and $Y_1$ are as previously defined, $r$ and $z$ have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl containing radical residuum E, can be a monoepoxide or diepoxide. By "epoxide" is meant a compound containing an oxirane group, i.e. oxygen bonded to two vicinal aliphatic carbon atoms, thus

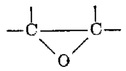

A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., >C=C< and acetylenic unsaturation i.e., —C≡C—, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen $$-\overset{\substack{O \\ \|}}{C}-O-$$

carbonyl oxygen $$-\overset{\substack{O \\ \|}}{C}-$$

and the like.

Specific examples of monoepoxides include epichlorohydrins such as epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and the like.

Illustrative diepoxides include diethylene glycol bis(3,4-epoxycyclohexane-carboxylate),
bis(3,4-epoxycyclohexylmethyl)adipate,
bis(3,4-epoxycyclohexylmethyl)phthalate,
6-methyl-3,4-epoxycyclohexylmethyl-6-methyl-3,4-epoxycyclohexane carboxylate,
2-chloro-3,4-epoxycyclohexylmethyl-2-chloro-3,4-epoxycyclohexane-carboxylate,
diglycidyl ether,
bis(2,3-epoxycyclopentyl)ether,
1,5-pentanediol bis(6-methyl-3,4-epoxycyclohexylmethyl) ether,
bis(2,3-epoxy-2-ethylhexyl)adipate,
diglycidyl maleate,
diglycidyl phthalate,
3-oxatetracyclo[4.4.0.$1^{7,10}$.$0^{2,4}$]undec-8-yl 2,3-epoxypropyl ether,
bis(2,3-epoxycyclopentyl)sulfone,
bis(3,4-epoxyhexoxypropyl)sulfone,
2,2'-sulfonyldiethyl bis(2,3-epoxycyclopentane-carboxylate), 3-oxatetracyclo[4.4.0.$1^{7,10}$.$0^{2,4}$]undec-8-yl 2,3-epoxybutyrate,
4-pentenal-di-(6-methyl-3,4-epoxycyclohexylmethyl) acetal,
ethylene glycol bis(9,10-epoxystearate),
diglycidyl carbonate,
bis(2,3-epoxybutylphenyl)-2-ethylhexyl phosphate, diepoxydioxane, butadienedioxide, and 2,3-dimethyl butadiene dioxide. The preferred diepoxides are those wherein each of the oxirane groups is connected to an electron donating substituent which is not immediately connected to the carbon atoms of the oxirane group. Such diepoxides have the grouping

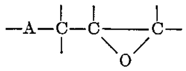

wherein A is an electron donating substituent such as

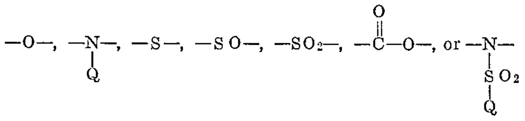

and Q is a saturated hydrocarbon radical such as an alkyl, cycloalkyl, aryl or aralkyl radical.

A single monoepoxide or diepoxide or a mixture of at least two monoepoxides or diepoxides can be employed in preparing thermoplastic polyhydroxyethers and the terms "monoepoxide" and "diepoxide" are intended to include a mixture of at least two monoepoxides or diepoxides, respectively.

Melt flow of each of the thermoplastic polyhydroxyethers was determined by weighing in grams the amount of polyhydroxyether, which, at a temperature of 220° C. and under a pressure of 44 p.s.i., flowed through an orifice having a diameter of 0.0825" and a length of 0.315" over a ten minute period. Four such determinations were made and the average of the four determinations is reported as decigrams per minute under a pressure of 44 p.s.i. and at 220° C.

The thermoplastic polyhydroxyether used in the examples unless otherwise stated was prepared by the reaction of equimolar amounts of 2,2-bis(4-hydroxyphenyl) propane and epichlorohydrin together with sodium hydroxide. Equipment used was provided with a sealed stirrer, thermometer, and reflux condenser. There was placed therein:

| | Parts |
|---|---|
| 2,2-bis(4-hydroxyphenyl)propane (0.5) mole) | 114.5 |
| Epichlorohydrin (99.1%) pure (0.5 mole) | 46.8 |
| Ethanol | 96.0 |
| Butanol | 10.0 |
| Sodium hydroxide (97.5%) pure | 22.6 |
| Water | 70.0 |

The above mixture was stirred at room temperature for 16 hours to accomplish the initial coupling reaction. The mixture was then heated at 80° C. for an hour. Sixty milliliters of a 7:3 mixture of toluene:butanol was added. Heating of the mixture at 80° C. was continued another two hours. There was added an additional 50 parts of the 7:3 toluene:butanol mixture and 4.5 parts of phenol. The contents of the vessel were then heated at 80° C. (reflux) for 2½ hours. Upon cooling, the reaction mixture was cut with 200 parts of the 7:3 toluene: butanol mixture. One hundred parts of water was added and agitated with the contents to dissolve salts present in the reaction mixture. The vessel contents were allowed to settle for ten minutes during which time a lower brine phase formed. This lower phase was separated by decantation. The upper polymer solution containing phase was washed successively with two 160 part portions of water containing 4.5% butanol. The washed polymer solution was acidified by stirring the solution with a mixture of 1 part of 85% phosphoric acid with 100 parts of water (pH=2) for one hour. The upper polymer solution phase was again separated by decantation and water washed with four successive 200 part portions of water containing 4.5% butanol. The washed polymer was then coagulated in 1,000 parts of isopropanol, filtered, and dried. There was obtained a thermoplastic polyhydroxyether of 2,2-bis(4-hydroxyphenol)propane and epichlorohydrin having a melt flow of 7.0 decigrams per minute.

Thermoplastic polyhydroxyethers having melt flows between 0.5 and 20 and more particularly 1 to 10 are preferred.

The thermoplastic polyhydroxyethers of the present invention are substantially free of 1,2-epoxy groups as evidenced by the application of the two "epoxide equivalent" analytical tests described in "Epoxy Resins" by H. Lee and K. Neville, pages 21–25, McGraw Hill Book Co., Inc., N.Y. (1957). In the first test, which involves the reaction of 1,2-epoxy groups with a known amount of hydrochloric acid followed by back-titration of the acid consumed, no hydrochloric acid was consumed. In the second test in which the infrared absorbance at 10.95 and 11.60μ was measured (wave lengths at which 1,2-epoxy groups absorb light) no absorbance was demonstrated by the thermoplastic polyhydroxyethers. Thus, it may be concluded that within the experimental limits of these standard tests no 1,2-epoxy groups are present in these thermoplastic polyhydroxyethers.

The preferred elastomers for use in the present invention are linear polyurethanes. A particularly preferred polyurethane is a block copolymer prepared by the reaction of a low molecular weight poly(1,4-butyleneadipate) hydroxyl-terminated with a 1,4-butanediol and (bis-4-isocyanatophenyl)methane. Other polyurethanes include those obtained by a reaction of other polyols and organic polyisocyanates. Some of the polyols which can be mentioned include:

(A) Polyoxyalkylene polyols such as alkylene oxide adducts of for example water, ethylene glycol, diethylene glycol, propylene glycol, dipropylene glycol, glycerol, 1,2,6-hexanetriol, sorbitol, triethanolamine, ethylenediamine, diethylenetriamine, anilineformaldehyde condensation product and the like. The alkylene oxides employed in producing polyoxyalkylene polyols normally have from 2 to 4 carbon atoms. Propylene oxide and mixtures of propylene oxide with ethylene oxide are preferred.

(B) Polyesters of polyhydric alcohols and polycarboxylic acid such as those prepared from an excess of ethylene glycol, propylene glycol, 1,1,1-trimethylol propane, glycerol, or the like reacted with phthalic acid, adipic acid, and the like.

(C) Lactone-based polyols prepared by reacting either a lactone such as epsilon-caprolactone and gamma-valerolactone or a mixture of a lactone and an alkylene oxide with a polyfunctional initiator such as a polyhydric alcohol, amine, or an amino alcohol, and the like.

Suitable organic polyisocyanates which can be employed in the preparation of polyurethane useful in this invention include 2,4-tolylene diisocyanate, 2,6-tolylene diisocyanate, crude tolylene diisocyanate, polyphenylmethylene-polyisocyanates that are produced by phosgenation of aniline-formaldehyde condensation products, xylylene diisocyanates, bis(2-isocyanatoethyl) fumarate, bis(2-isocyanatoethyl) carbonate and many other polyisocyanates that are known in the art, such as those that are disclosed in an article, Siefken, Ann. 562, 75 (1949). In general, the aromatic polyisocyanates are preferred because of their greater reactivity. Other elastomeric additives which can be used include polybutadiene rubber, acrylonitrile-butadiene rubber (styrene-butadiene rubber, polyvinylethyl ether and the like.

The preferred primary plasticizers are dialkyl phthalates of which dibutyl phthalate is particularly preferred. Other dialkyl phthalates include dioctyl phthalate, butyl benzyl phthalate, dicapryl phthalate, dibutyoxyethyl phthalate and the like.

Representative phosphates which can be used include tricresyl phosphate, octyldiphenyl phosphate, trioctyl phosphate and the like.

Representative dialkyl esters of dibasic aliphatic acids which can be used include dioctyl adipate, dicapryl adipate, dimethyl, diethyl, dibutyl or dioctyl sebacate, and the like.

The matrix sheets used in the practice of the invention can be fabricated from a wide range of thermoplastic polymers such as vinyl chloride polymers, polystyrene, polyolefins, polyacrylates, polymethacrylates and the like by any known thermoplastic forming technique such as extrusion, compression molding, injection molding, calendering, solution casting and the like. The thickness of sheets employed is not critical but is determined by practical considerations such as cost and ease of forming. In general, the most useful range of thickness for the matrix sheets is from about 0.030 inch to about 0.250 inch while the preferred range is about 0.040 inch to about 0.080 inch.

The matrix is generally formed by contacting a sheet of thermoplastic polymer with an original type-form, engraving or photo etched plate, applying heat and pressure, separating the matrix and original and allowing the matrix to cool. In this manner, excellent reproduction of the original is obtained in the matrix. The temperature at which the matrix can be formed is not narrowly critical. The limits are bounded in each instance by the softening temperature and decomposition temperature of the thermoplastic polymer being used.

Molding pressures used for the matrix preparation can vary widely as, for example, in the range of about 200 to 4000 p.s.i.g.

If desired, mold release agents can be employed to effect easier separation of the matrix from the original. Suitable mold release agents include graphite, molybdenum sulfide, silicone oils, and the like.

The electrotype shell is prepared by first sensitizing the surface of the matrix with a stannous chloride solution and then rendering this surface electroconductive by depositing metallic silver on it by reducing an ammoniacal silver salt solution in contact with it. Usually a 0.5 mil thick deposit of nickel is electroplated over the silver followed by a 10 to 15 mils thick coating of electrodeposited copper. The electrotype metal shell is then stripped from the matrix and is ready for backing to the desired printing plate thickness. For high speed rotary presses the backed up printing plate, ⅛" thick, is usually laminated to an aluminum saddle so that the plate can be securely locked on the press without danger of succumbing to centrifugal forces and flying off during a long run.

The thermoplastic polyhydroxyether compositions of the present invention can be molded as backs from pellets on flat electrotype shells by compression molding.

Where curved instead of flat printing plates are desired a curved mold is used.

The thermoplastic polyhydroxyether backing compositions of this invention bond very tightly to aluminum saddles which preferably have been degreased and etched with chromic acid.

Electrotype printing plates backed with thermoplastic polyhydroxyether compositions according to the claimed invention shrink uniformly in all directions no more than about 0.5 percent from their original dimensions.

Another attribute of this backing system is that it is transparent and permits the operator to observe if any bubbles of air have been trapped between the plate and the backing which could cause delamination and failure during the operation of the press.

The invention is further described by the examples which follow in which all parts and percentages are by weight unless otherwise specified.

EXAMPLE 1

A finished, flat, easily curvable electrotype printing plate, having a backing formed from thermoplastic polyhydroxyether, was made by the following means. An 8 x 11 piece of .040" thick calendered vinyl sheet, consisting of 97 parts vinyl chloride/vinyl acetate copolymer having 12% vinyl acetate copolymerized therein, 2 parts basic lead carbonate stabilizer and 1 part carbon black was placed in a 12" x 12" steam heated hydraulic molding press in contact with a .065" thick magnesium photoengraved original printing plate. The original and vinyl sheet were heated to 300° F. with contact pressure only between platens for three minutes, after which 300 p.s.i. pressure was applied for 1 minute. Cold water was then circulated through the platens until the temperature of the original and the vinyl printing plate matrix so produced were reduced to 75° F. The resultant matrix was then separated from the original pattern and was found to have perfect reproduction of the detail in the original.

This matrix was then degreased by washing in heptane and dried.

To render its surface electrically conductive, in preparation for electroplating the nickel-copper shell, the matrix was first dipped in a sensitizing solution having the following formula:

Stannous chloride ($SnCl_2 \cdot 2H_2O$)—100 grams
Conc. hydrochloric acid (37% HCl)—400 cc.
Water—1,000 cc.

Immersion time was for one minute, followed by a one minute rinse in running water, preparatory to being sprayed by the reducing solution of a silver salt with the following composition:

| | G./l. |
|---|---|
| Solution A: | |
| Silver nitrate ($AgNO_3$) | 9.59 |
| Ammonia ($NH_3$), added as 28% solution in water | 4.39 |
| Water to make 1 liter. | |
| Solution B: | |
| Hydrazine sulfate $(NH_2)_2 \cdot H_2SO_4$ | 19.18 |
| Sodium hydroxide (NaOH) | 4.79 |
| Water to make 1 liter. | |

These two solutions were fed separately to a mixing spray gun in equal (1:1) proportions. This spray gun coated the mixture evenly over the surface of the matrix. The silver was reduced and plated out immediately on the sensitized vinyl surface into a uniform, thin, conductive layer of metallic silver. The silvered matrix was then affixed with tar to an asphalt coated fiber board back to which the electrode conductor was fastened so as to make good electrical contact with the silver conductive layer on the matrix.

A nickel shell of .0005" thick was then deposited on the silver conductive surface of the matrix from a Watts type acid electrolytic nickel plating bath containing:

| | G./l. |
|---|---|
| Nickel sulfate ($NiSO_4 \cdot H_2O$) | 240 |
| Nickel chloride ($NiCl_2$) | 30 |
| Boric acid ($H_3BO_3$) | 30 |
| Sulfuric acid to give pH 4. | |
| Water to make 1 liter of solution. | |

Two nickel anodes were hung from the positive bus bar in the plating tank. The silvered matrix was hung from the negative bus bar. Plating was begun by passing a direct current of 50 amperes per square foot of matrix surface through the bath for twelve minutes at a bath temperature of 75° F. to deposit the .0005" nickel shell.

The matrix with .0005" thick electroplated nickel shell on it was then transferred to an acid copper sulfate plating bath containing:

| | G./l. |
|---|---|
| Copper sulfate ($CuSO_4 \cdot 5H_2O$) | 188 |
| Sulfuric acid ($H_2SO_4$) | 74 |

Water to make 1 liter of solution.

Plating was carried on with a direct current density of 150 amps per square foot for 90 minutes to build up a shell thickness of approximately 0.015" on top of the .0005" layer of nickel. The shell was then rinsed in running water and separated from the matrix.

A plastic electrotype backing compound was prepared by blending a thermoplastic polyhydroxyether resin having 4 melt flow (dg./min.) at 190° C., a tensile strength of 8500 p.s.i., tensile modulus of 370,000 p.s.i. and ⅛" notched Izod impact of 1.5 fl./lbs. per inch of notch (72.5 parts), with a polyurethane block copolymer prepared by the reaction of a low molecular weight hydroxyl terminated poly(1,4-butylene adipate) with a 1,4-butanediol and (bis-4-isocyantophenyl) methane having an RVF Brookfield viscosity at 20 r.p.m. and 25° C. of 650 cps. and Shore durometer hardness of 75A (15.0 parts), dibutyl phthalate (12.5 parts) and Zn stearate (0.125 part). To facilitate incorporation of the dibutyl phthalate into the mixture, the 12.5 parts of the plasticizer were heated with 6.25 parts (out of the total of 72.5 parts) of the polyhydroxyether for one hour at 400° F. to form a solution. When cooled to room temperature the mixture formed a viscous mass that could be readily weighed out for compounding.

Eight pounds of the above formulation were compounded in an eight pound Banbury mixer for 15 minutes. Cold water was circulated through the rotors. The batch was then transferred to a two roll mill and milled for 5 minutes with 220° F. on the front roll and 200° F. on the back roll. When cooled to room temperature the milled sheet was granulated in a Cumberland granulator without difficulty.

Manufacture of the batch was controlled to give a stress relaxation of 51.8% in 5 min. at 0.5% strain. The test was run in the following manner on an Instron tensile tester. Plaques 8" x 8" x .060" were compression molded from granules by heating in a cavity mold in a 10" x 10" hydraulic press for three min., with contact pressure only, to soften the resin, then under 300 p.s.i. for one minute, then cooled to room temperature.

From this plaque two tensile specimens were milled with shanks 2" long, 0.060" thick and 0.5" wide. These specimens were fastened in the tensile tester and loaded at a strain rate of 0.1"/min. until the total strain over the two inch span was 0.01" or 0.5%. With strain maintained constant the stress relaxation after 5 min. was recorded. The stress relaxation value was found by the formula:

$$\text{Percent stress relaxation} = \frac{\text{max. stress} - \text{stress after 5 min.}}{\text{max. stress}} \times 100$$

A copper-nickel electrotype shell prepared as above was degreased with a heptane wash, dried and immersed in a 10% by weight solution of ammonium persulfate in water at room temperature for five minutes with vigorous agitation to remove loose copper salts and to form a tightly bonded copper oxide coating on the shell. This coating was then protected from further oxidation by spreading and drying a coating of polyhydroxyether resin from a solution containing 25% non-volatiles in a solvent consisting of a one to one ratio of methyl ethyl ketone and toluene. The coating was thoroughly dried by heating in an oven for 10 minutes at 150° F.

The shell was then backed up with the thermoplastic polyhydroxyether composition by placing the shell face downwards in an electrically heated and water-cooled hydraulic press. The shell was surrounded by a 0.125" thick aluminum frame, 3" wide, having a 7" x 10" interior dimension to form a cavity for the resin granules. Four tenths of a pound of granules of high stress relaxation polyhydroxyether resin prepared as above were spread on the back of the shell inside the cavity formed by the frame. The press had been preheated to 450° F. The platens were closed and held with contact pressure only for three minutes until the resin granules became thoroughly fluxed. 80 p.s.i. pressure was then applied to flow out the resin and laminate the resin to the shell. Pressure was carefully limited to no more than 80 p.s.i. so as not to collapse the non-printing areas of the shell. After one minute under pressure at 450° F., the laminate was cooled to about 100° F. and removed from the press. At this temperature the plate was flat, showing no curvature as the result of differential thermal contraction of the copper and the plastic backing. The plate was immediately shaved to a uniform gage of 0.125"±0.001" in preparation for mounting on a curved aluminum saddle. The purpose of this saddle, which was 0.125" thick, was to provide a rigid base by which the plastic backed electrotype could be fastened to the plate cylinder of a rotary letterpress. The saddle was precured to a radius of 6¾" to fit the cylinder on which it was to be mounted.

In order to obtain the optimum bond, the surface of the aluminum was degreased by washing in heptane and then treated in a chromic acid bath having a composition of:

| | Parts by weight |
|---|---|
| Sodium dichromate ($Na_2Cr_2O_7 \cdot H_2O$) | 1 |
| Sulfuric acid (96% $H_2SO_4$) | 10 |
| Water | 30 |

The sodium dichromate was dissolved in the water first; the sulfuric acid then added and the temperature of the bath raised to 150° F. The saddle was immersed in this bath for 10 minutes, then rinsed in cold, running water for 10 minutes.

The polyhydroxyether backed printing plate was adhered to the saddle to form a laminated printing plate 0.250" thick by reheating it to 300° F. in contact with the treated aluminum saddle in a pair of curved, mating dies whose outer and inner radii matched the curvatures of the front and back of the finished printing plate.

The dies were fitted into a hydraulic press and connected to steam and cold water for heating and cooling. Bearers or stops were used to maintain the thickness at the correct amount for mounting on the press at 0.250". As the resin backing heated up, the plate conformed readily to the saddle. Temperature was maintained at 300° F. for 2 minutes until the backing adhered to the treated aluminum surface to form a strong, unbreakable bond. After trimming and beveling the edges and routing away the "dead metal" in the non-image areas the plate was ready for press.

EXAMPLE 2

One hundred and fifty pounds of a polyhydroxyether compound was made with the following composition:

| | Parts | Pounds |
|---|---|---|
| Polyhydroxyether, 4 Melt flow | 67.2 | 100.7 |
| Polyurethane [a] 70A Shore durometer | 13.5 | 20.3 |
| Dibutyl phthalate/polyhydroxyether solution [b] | 19.3 | 29.0 |
| Zinc stearate | .125 | 0.2 |
| Colorant | .05 | 0.07 |

[a] Block copolymer of poly(1,4-butyleneadipate) hydroxyl-terminated with 1,4-butanediol and bis(4-isocyantophenyl) methane.

[b] This solution was prepared by dissolving 5.8 parts of 4MF polyhydroxyether in 13.5 parts of dibutyl phthalate at 400° F. with vigorous agitation in a 10 gallon Durotherm heated still, running the solution into a pail and cooling. At room temperature this is a viscous dispersion that can be ladled out for weighing up.

This mixture was compounded in a 150 lbs. Banbury mixer for 8 minutes with cold water running through the rotors and the jackets. Drop temperature from the Banbury was 140° C. as measured by a needle pyrometer. The batch was transferred to a two roll mill with roll temperatures of 50° and 55° C. and milled for five minutes, then transferred to a calender, having roll temperatures set at 60°, 60° and 55° C. and sheeted to 0.135" thick followed by partial cooling by passage through a short water trough. The material was then diced and cooled to room temperature.

Stress relaxation tests performed as in Example 1 gave values of 57.6%.

Composition, stress relaxation, heat distortion temperature, and compressive strengths were as shown in Table I. Nickel-cooper electrotype shells were made and backed up with these compositions as described in Example 1. These plates could all be flattened without distortion, that is the stresses due to differential thermal contraction of the metal and the plastic were relieved, by placing the plates under 10 lb. weights for varying periods of time, after which all plates were flat, ready for finishing and mounting.

TABLE I

| Parts by Weight Concentrations | Examples 3 | 4 | 5 | 6 | 7 | 8 | 9 | 10 | 11 |
|---|---|---|---|---|---|---|---|---|---|
| Polyhydroxyether 4 Melt Flow | 80.0 | 76.5 | 75.0 | 74.0 | 72.5 | 73.0 | 75.0 | 72.5 | 71.5 |
| Polyurethane [a] | 10.0 | 11.0 | 12.5 | 12.5 | 12.5 | 13.5 | 15.0 | 15.0 | 15.0 |
| 70 Shore A durometer: | | | | | | | | | |
| Dibutyl phthalate | 10.0 | 12.5 | 12.5 | 13.5 | 15.0 | 13.5 | 10.0 | 12.5 | 13.5 |
| Zn stearate | 0.2 | 0.2 | 0.2 | 0.2 | 0.2 | 0.2 | 0.2 | 0.2 | 0.2 |
| Properties: | | | | | | | | | |
| Percent stress relaxation in 5 min. at 0.5% strain | 26.7 | 30.0 | 38.7 | 47.2 | 83.0 | 55.7 | 45.0 | 51.8 | 68.8 |
| 264 p.s.i. heat distortion temp., ° C | 43.0 | 42.0 | 36.5 | 34.7 | 28.4 | 35.1 | 36.5 | 28.9 | 26.4 |
| Tensile modulus of elasticity, p.s.i | 273,000 | 249,000 | 233,000 | 158,000 | 54,000 | 140,000 | 190,000 | 146,500 | 63,800 |
| Time required to flatten out a plate using a 10 lb. weight, min | 120 | 75 | 60 | 30 | 7 | 20 | 30 | 20 | 10 |

[a] Block copolymer of ploy(1,4-butylene adipate) hydroxyl terminated with 1,4-butanediol and bis(-4-isocyanotophenyl) methane.

NOTE.—All compounds gave excellent adhesion to copper shells when molded on to them at 475° F.

Twelve electrotype shells were prepared, backed up and mounted on curved aluminum saddles using this plastic compound and the methods described in Example 1. Total thickness of the laminate was 0.187". This set of plates constituted the black form of a two-color printing job. They were locked on the plate cylinder of a Miehle sheet fed rotary letterpress by the conventional compression lockup system.

This set of plates were run for 300,000 impressions. Makeready was reduced because of the level nature of the plates. During the run the plates showed no sign of breaking down or flowing under pressure. There was no sidewise movement such as occurs sometimes with plates mounted with 2-sided pressure sensitive tape. All bonds between polyhydroxyether and both the copper shells and the aluminum saddles held very well. There were no spots where type letters were depressed by the press pressure because of small bubbles of air trapped in the cavities formed by the backs of the type letters as is often the case with plastic backed electrotypes made from thermosetting plates or from rigid sheets or granules of conventionally used polyvinyl chloride resins. The transparent nature of this compound made it possible for any of these bubbles to be observed if they had been present.

A set of 12 matching color plates were made in the same way for the same job and mounted on the press to print the second color. Many of those plates were so called "spot color" plates where only one or two spots of solid color registered into the black subjects at widely separated spots on an individual plate. In order not to have ink rollers and paper touch the bottoms of the non-image areas of the spot color plates, the shells were routed away between the color spots thus releasing the restraining influence of the nickel-copper shell on the need for the plastic to shrink the full amount determined by its coefficient of thermal contraction. With other plastic materials which do not have the built-in stress relaxation of these polyhydroxyether compositions, the plastic then shrinks to its normal amount and the color spots are out of register with their black plates (where no routing was done, so that the plastic could not shrink to its full amount). All the color plates backed up with this composition fitted perfectly into their respective black plates.

This set of color plates were locked onto the press and found to fit their black key plates perfectly, thus significantly reducing makeready time due to registration. This set was also run for 300,000 impressions without any sign of breakdown or moving.

EXAMPLES 3–11

Eight pound batches of the following polyhydroxyether compounds were made up as described in Example 1.

EXAMPLES 12–16

One pound batches of the following polyhydroxyether compounds were made up by milling the ingredients together on a two-roll mill having 150° C. on the back roll and 135° C. on the front roll for ten minutes. Pieces of hot sheet, direct from the mill, were compression molded at 150° C. onto the backs of nickel-copper electrotype shells made as described in Example 1. Satisfactory printing plates were produced in each case. This example demonstrates the effects on stress relaxation and distortion of the metal shells of other elastomeric materials and liquid plasticizers in addition to the preferred polyurethane and dibutyl phthalate employed in Examples 1 through 3. Compositions and results are shown in Table II below.

TABLE II.—EFFECT ON STRESS RELAXATION OF VARIOUS ELASTOMERS AND PLASTICIZERS ON POLYHYDROXYETHER COMPOSITIONS

| Parts by Weight Composition | Examples 12 | 13 | 14 | 15 | 16 |
|---|---|---|---|---|---|
| Polyhydroxyether 4 Melt Flow | 83.2 | 70.0 | 80.0 | 75.0 | ----- |
| Polyhydroxyether 1 Melt Flow | | | | | 75.0 |
| Polyurethane ([a]) 70 A durometer | | | | | 12.5 |
| Polyurethane ([a]) 76 A durometer | | 25.0 | | | |
| Dioctyl phthalate | 10.0 | | | | |
| Trioctyl phosphate | | 5.0 | 10.0 | ----- | 12.5 |
| Polyvinyl ethylether | | | | 20.0 | ----- |
| Dibutyl phthalate | | | | 5.0 | ----- |
| Butadiene/acrylonitrile rubber | 6.8 | | | | |
| Polyamide resin [b] (low molecular weight—See attached note.) | | | 10.0 | | |
| Percent stress relaxation in 5 min. at 0.5% strain | 28.3 | 18.7 | 21.0 | 18.5 | 30.8 |

[a] Block copolymer of poly(1,4-butylene adipate) hydroxyl terminated with 1,4-butanediol and (bis-4-isocyanotophenyl) methane.

[b] This polyamide resin is the polymeric reaction product of dimerized linoleic acid and ethylene diamine, having an amine number of 88 and a viscosity at 150° C. of 10 poises as measured by a Model RVF Brookfield Viscometer.

Stress relaxations of less than 18% do not make any improvement in the ability of the backed up electrotype to be flattened out without distorting the copper. Compositions with greater than 85% stress relaxation are too soft to stand up in the printing press. Preferred range is from 35 to 65%.

Although the invention has been described in its preferred forms with a certain amount of particularity, it is understood that the present disclosure has been made only by way of example and that numerous changes can be made without departing from the spirit and scope of the invention.

What is claimed is:

1. Method of preparing resin-back, undistorted electrotype printing plates capable of being accurately registered in four color printing processes which comprises bonding a metal electrotype shell to a resin composition comprising:

(1) about 60 to 90 parts by weight of a thermoplastic polyhydroxyether having the general formula:

$$\text{-}[D\text{—}O\text{—}E\text{—}O]\text{-}_n$$

wherein D is the radical residuum of a dihydric phenol, E is a hydroxyl-containing residuum of an epoxide, and *n* represents the degree of polymerization and is at least 30, (2) about 5 to 30 parts by weight of a polyurethane block copolymer of a poly(1,4-butylene adipate) hydroxyl-terminated with a 1,4-butanediol and (bis-4-isocyanotophenyl)methane, and (3) about 5 to 30 parts by weight of dibutyl phthalate, at a temperature of about 250° to 525° F. and a pressure of about 10 to 80 p.s.i.g.

2. Resin-backed, undistorted electrotype printing plate capable of being accurately registered in multi-color printing processes which comprises a metal electrotype shell and bonded to said shell a continuous layer of a resin composition which comprises:

(1) about 60 to 90 parts by weight of a thermoplastic polyhydroxyether having the general formula:

$$\text{-}[D\text{—}O\text{—}E\text{—}O]\text{-}_n$$

wherein D is the radical residuum of a dihydric phenol, E is a hydroxyl-containing residuum of an epoxide, and *n* represents the degree of polymerization and is at least 30, (2) about 5 to 30 parts by weight of a polyurethane block copolymer of a poly(1,4-butylene adipate) hydroxyl-terminated with a 1,4-butanediol and (bis-4-isocyanotophenyl)methane, and (3) about 5 to 30 parts by weight of dibutyl phthalate.

3. Printing plate claimed in claim 2 wherein the metal electrotype shell is copper, D is the radical residuum of a bis(hydroxyphenyl)alkane, E is the radical residuum of an epihalohydrin and *n* is at least 80.

4. Printing plate claimed in claim 3 wherein the bis (hydroxyphenyl)alkane is 2,2-bis(4-hydroxyphenyl)propane, and the epihalohydrin is epichlorohydrin.

5. Printing plate claimed in claim 3 wherein the resin composition is bonded to a surface-oxidized copper electrotype shell.

References Cited

UNITED STATES PATENTS

| | | | |
|---|---|---|---|
| 3,029,730 | 4/1962 | Parrish et al. | 101—401.1 |
| 3,177,090 | 4/1965 | Bayes et al. | 260—831 XR |
| 3,287,205 | 11/1966 | Bugel | 260—837 XR |
| 3,308,205 | 3/1967 | Bugel | 260—837 XR |
| 3,320,090 | 5/1967 | Graubart | 260—858 XR |

DAVID KLEIN, Primary Examiner

U.S. Cl. X.R.

101—401.1; 156—330; 260—831, 837, 858